(12) United States Patent
Willmann

(10) Patent No.: US 6,691,051 B2
(45) Date of Patent: Feb. 10, 2004

(54) TRANSIENT DISTANCE TO FAULT MEASUREMENT

(75) Inventor: Leroy J. Willmann, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 162 days.

(21) Appl. No.: 09/929,475

(22) Filed: Aug. 14, 2001

(65) Prior Publication Data

US 2003/0036863 A1 Feb. 20, 2003

(51) Int. Cl.[7] ............................................. G01R 27/26
(52) U.S. Cl. ......................... 702/76; 702/57; 702/58; 702/59; 702/64; 702/77; 702/81
(58) Field of Search ............................. 702/57, 58, 59, 702/64, 66, 67, 71, 72, 75–77, 81, FOR 103–110; 361/78, 79, 80, 89; 324/522, 523, 527, 528, 531, 532, 534, 535, 536

(56) References Cited

U.S. PATENT DOCUMENTS

| | | | | | |
|---|---|---|---|---|---|
| 3,983,377 A | * | 9/1976 | Vitins | ............................ | 702/59 |
| 4,053,816 A | * | 10/1977 | Nimmersjo | .................... | 361/62 |
| 4,092,690 A | * | 5/1978 | Wilkinson | .................... | 361/80 |
| 4,151,459 A | * | 4/1979 | Fayolle et al. | ............... | 324/533 |
| 4,165,482 A | * | 8/1979 | Gale | ............................ | 324/523 |
| 4,187,461 A | * | 2/1980 | Cox | ............................. | 324/102 |
| 4,291,204 A | * | 9/1981 | Crick | ........................... | 324/456 |
| 4,433,353 A | * | 2/1984 | Wilkinson | .................... | 361/80 |
| 4,500,834 A | * | 2/1985 | Ko et al. | ..................... | 324/534 |
| 4,812,995 A | * | 3/1989 | Girgis et al. | ................. | 700/292 |
| 4,896,241 A | * | 1/1990 | Li et al. | ......................... | 361/66 |
| 5,453,903 A | * | 9/1995 | Chow | ............................ | 361/79 |
| 5,517,585 A | * | 5/1996 | Dowling | ....................... | 382/291 |
| 5,579,197 A | * | 11/1996 | Mengelt et al. | ............. | 361/93.4 |
| 5,600,248 A | * | 2/1997 | Westrom et al. | ............. | 324/522 |
| 5,682,100 A | * | 10/1997 | Rossi et al. | .................. | 324/535 |
| 5,703,745 A | * | 12/1997 | Roberts et al. | ............... | 361/89 |
| 6,028,754 A | * | 2/2000 | Guzman-Casillas et al. | .. | 361/89 |

* cited by examiner

*Primary Examiner*—Marc S. Hoff
*Assistant Examiner*—Carol S. W. Tsai
(74) *Attorney, Agent, or Firm*—Francis I. Gray

(57) ABSTRACT

A method of determining distance to fault of a transient event in a transmission system uses per frequency triggered I and Q data representing voltage and phase of a return signal in the frequency domain. Initially a result set of data entries, one for each discrete frequency in a specified frequency range, is filled with zeros and an initial acquisition set of per frequency I and Q data from the transmission system is used to fill a reference set of data entries. Subsequent acquisitions of per frequency data sets are used to fill a current set of data entries. Between each acquisition of data sets for the current set a comparison is made, entry by entry, between the current set and the reference set, and the data from the current set is used to update the corresponding entry in the result set when the difference exceeds a specified tolerance. When all of the entries of the current set have been compared, the result set is displayed by performing an inverse Fourier transform on the result set to provide a distance to fault display in the time domain. The data acquisitions occur while the transmission cable is being perturbed to stimulate the transient event.

6 Claims, 3 Drawing Sheets

TRANSIENT DISTANCE TO FAULT MEASUREMENT

BACKGROUND OF THE INVENTION

The present invention relates to transmission system fault measurements, and more particularly to a transient distance to fault (DTF) measurement using per frequency triggered I and Q data.

Many users have to deal with the problem of intermittent problems in transmission systems, such as loose or corroded connectors, antenna flaws, etc. For example where cables are exposed to environmental conditions, such as antenna cables exposed to wind and rain, loose or corroded connectors may result in intermittent loss or degradation of signal in the cables. This is particularly irritating to customers who rely upon a constant signal being carried by the cables, such as wireless subscribers, television viewers, radio listeners, etc.

The normal course of action to deal with such intermittent problems is to connect a distance to fault (DTF) or time domain reflectometer (TDR) to the transmission path and then shake the transmission cable or in some way cause the transient or intermittent event to occur in the transmission system. It is difficult to detect transients on DTF or time domain equipment because the transient event is masked by all of the non-transient data.

What is desired is a method for improving the ability to detect and identify distance to transient errors in a transmission system by using frequency domain equipment.

BRIEF SUMMARY OF THE INVENTION

Accordingly the present invention provides a transient distance to fault measurement using per frequency triggered I and Q data. Initially a result set of data entries, one for each discrete frequency in a specified frequency range, is filled with zeros and an initial acquisition set of per frequency I and Q data from a transmission system is used to fill a reference set of data entries. Subsequent acquisitions of per frequency data sets are used to fill a current set of data entries. Between each acquisition of data sets for the current set a comparison is made, entry by entry, between the current set and the reference set, and the data from the current set is used to update the entry in the result set when the difference exceeds a specified tolerance. The updating may be a direct copy of the entry data from the current set to the result set, an accumulation of the entry data with the data in the result set with or without weighting, or a replacement of the entry data in the result set when the current set entry data exceeds the result set entry data. When all of the entries of the current set have been compared with the reference set and the results processed for the result set, the result set is displayed by performing an inverse Fourier transform on the result set to provide a distance to fault display in the time domain. The data acquisitions occur while the transmission system is being perturbed to stimulate the transient event.

The objects, advantages and other novel features of the present invention are apparent from the following detailed description when read in conjunction with the appended claims and attached drawing.

DETAILED DESCRIPTION OF THE INVENTION

Figure 1:
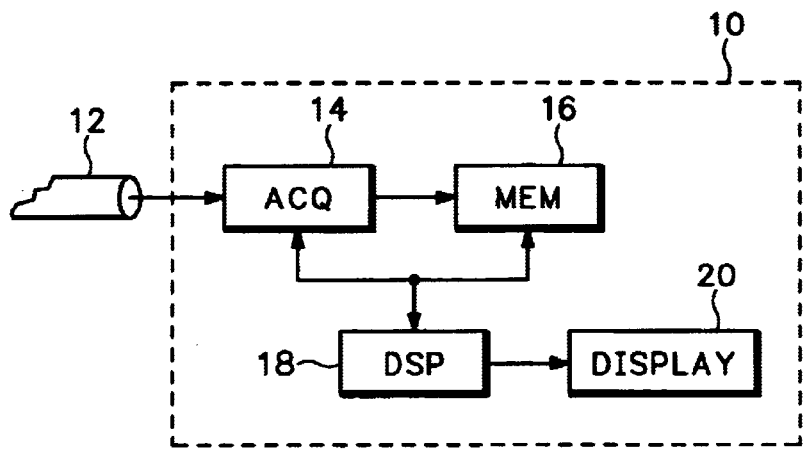
FIG. 1 is a block diagram view of a system for measuring transient distance to fault according to the present invention.

Referring now to FIG. 1 a measuring device 10 is shown connected to a transmission system under test 12, such as an antenna cable. The measuring device 10 has an acquisition subsystem 14, a storage device 16, a digital signal processor (DSP) 18 and a display 20. The acquisition system 14 provides a test signal to the system under test 12 and receives reflected voltage/phase signals. The measuring device 10 is a frequency domain device, so the test signal is a sinusoidal wave, the frequency of which is varied in discrete increments to cover a desired frequency range. This produces n data results, where n is the number of discrete frequencies used for the test signal. The result for each discrete frequency is an I and Q data pair representing the voltage and phase of the reflected signal from the system under test 12. These per frequency I, Q data pairs are stored in the storage device 16 as described below. The DSP 18 controls the acquisition process and how the data is stored and processed to produce distance to fault (DTF) measures to transient faults.

Figure 2:
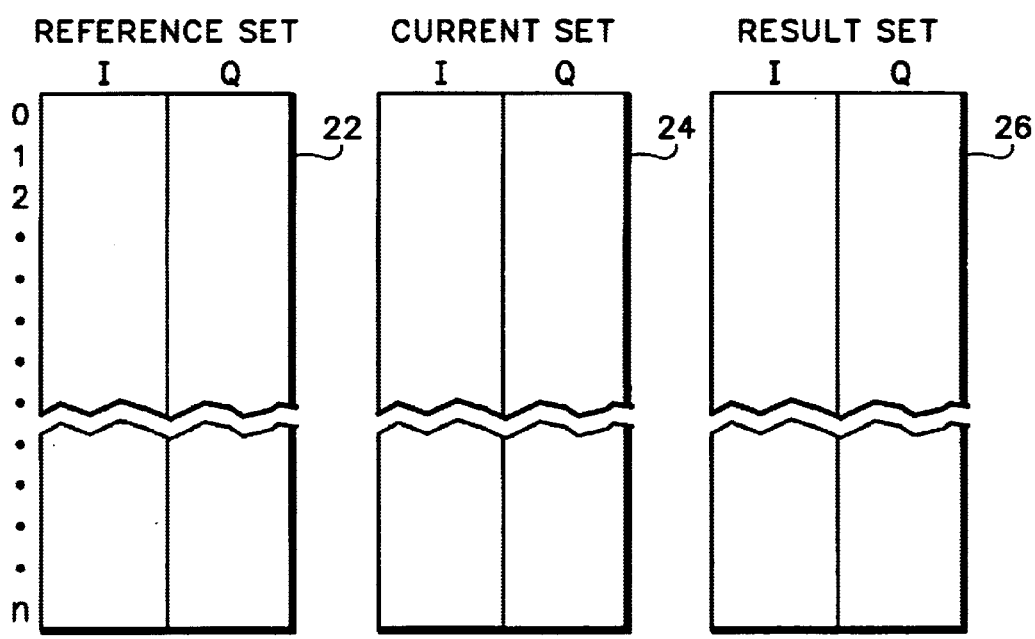
FIG. 2 is a representative view of a memory allocation for the system of FIG. 1.
Figure 3:
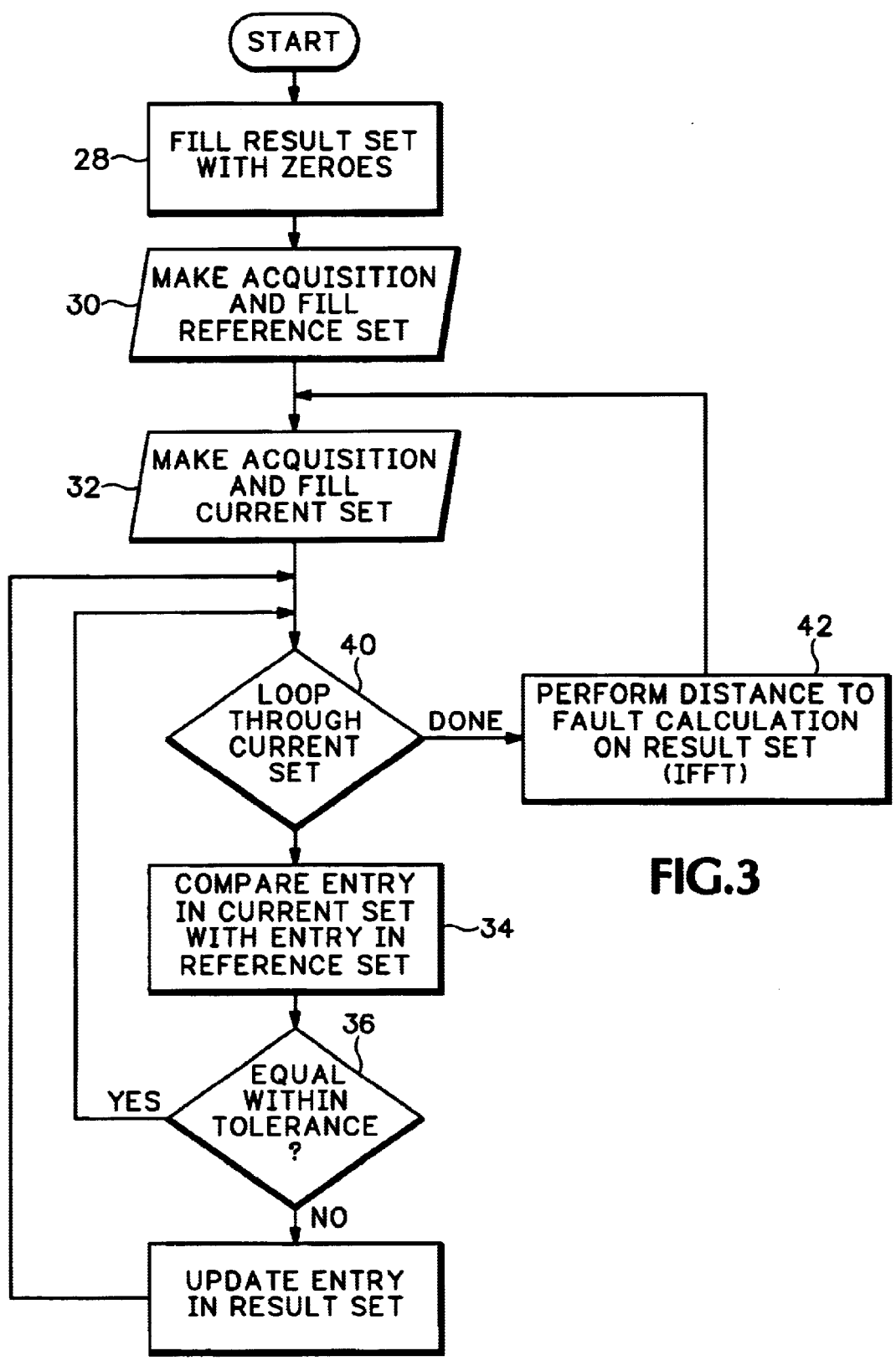
FIG. 3 is a flow diagram view of a method for measuring transient distance to fault with the system of FIG. 1.

The storage device 16 has three nx2 matrices representing a reference set 22, a current set 24 and a result set 26 of n per frequency I, Q data pairs, as shown in FIG. 2. The algorithm used by the DSP 18 for processing the I, Q data pairs acquired while the system under test 12 is being shaken or otherwise stressed to reproduce the transient faults is shown in FIG. 3. Initially at step 28 the result set 26 is filled with zeros. Then an initial acquisition of data is made over the frequency range to fill the reference set 22 with n I, Q data pairs at step 30. The next and each subsequent acquisition over the frequency range is used to fill the current set 24 with n I, Q data pairs at step 32. Before each subsequent acquisition each entry of the current set 24 is compared to each corresponding entry in the reference set 22 at step 34. For each comparison where the absolute difference exceeds a given tolerance at step 36, which tolerance may be 1 dB or less, the current entry from the current set 24 is used to update the entry at the corresponding location in the results set 26 at step 38. The updating may take the form of copying the entry from the current set 24 into the result set 26, accumulating the entry from the current set with the entry in the result set (accumulating includes averaging, adding, weighting, etc.—combining the current set entry with the result set entry), or copying the entry from the current set into the result set only if the value exceeds that already in the result set. When all of the entries in the current set 24 have been completed as determined at step 40, a distance to fault calculation on the result set is made at step 42 using an inverse Fourier transform to convert the result set 26 from the frequency domain to the time domain. The result is then output on the display device 20.

Figure 4:
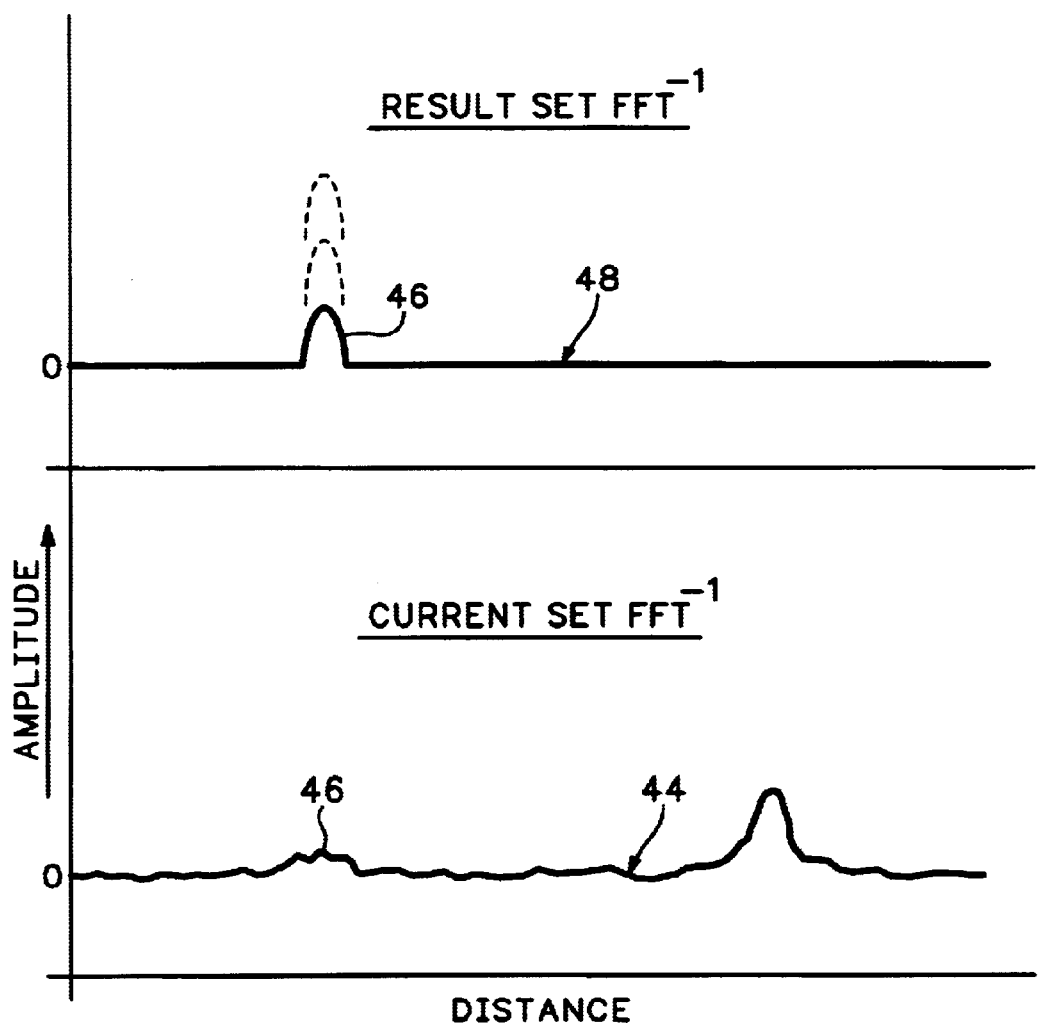
FIG. 4 is a graphic view of comparative measurement results using a prior art time domain system and a frequency domain system according to the present invention.

Referring now to FIG. 4 a first graph 44 shows an inverse FFT of the current set 24 that shows a typical distance to fault measurement with a transient event 46 being buried in the non-transient data. A second graph 48 as it might appear on the display device 20 shows the inverse FFT of the result set 26. Since the result set 26 contains zeros except where the transient event 46 occurs, there is a clear indication of the location of the transient event. In the presence of noise an averaging or accumulation algorithm may be used such that the noise is averaged out while the transient event 46 is accentuated since the noise tends to be Gaussian while the transient event is coherent. The more iterations, the more robust the indication of the transient event 46 in the second graph 48. Although shown as two displays, the two graphs 44, 48 may be merged into a single graph by adding the two inverse FFT results together.

Thus the present invention provides a method of determining transient distance to fault using per frequency triggered I and Q data by acquiring an initial set of data at each of a range of discrete frequencies as a reference set, acquiring subsequent sets of data as a current set, comparing each entry of the current set with the corresponding entry of the reference set, updating the corresponding entries of a result set that is initialized to all zeros with those entries of the current set that exceed a tolerance with respect to the reference set, and displaying the result set using an inverse Fourier transform to convert the frequency domain data to the time domain as a distance to fault.

What is claimed is:

1. A method of determining distance to fault of a transient event in a transmission system while perturbing the system comprising the steps of:

at each frequency over a range of discrete frequencies acquiring an initial set of I and Q data representing voltage and phase information of a reflected signal in the frequency domain from the transmission system and storing the initial set as a reference set;

acquiring subsequent sets of I and Q data at each frequency as a current set;

between each acquisition of I and Q data sets for the current set comparing each entry of the current set with a corresponding entry of the reference set;

for each comparison updating with the entry from the current set a corresponding entry of a result set when the comparison exceeds a specified tolerance value, the result set being initially set to all zeros; and converting the result set from the frequency domain to the time domain to display the distance to fault of the transient event.

2. The method as recited in claim 1 wherein the updating step comprises the step of copying the entry from the current set into the corresponding entry in the result set when the comparison exceeds the specified tolerance value.

3. The method as recited in claim 1 wherein the updating step comprises the step of accumulating the entry from the current set with the corresponding entry in the result set when the comparison exceeds the specified tolerance value.

4. The method as recited in claim 1 wherein the updating step comprises the steps of:

comparing the entry from the current set with the corresponding entry in the result set when the comparison exceeds the specified tolerance value; and replacing the corresponding entry in the result set with the entry from the current set when the entry from the current set exceeds the corresponding entry in the result set.

5. The method as recited in any of claims 1–4 further comprising the step of converting the current set from the frequency domain to the time domain to display a traditional distance to fault graph.

6. The method as recited in claim 5 further comprising the step of adding the results of the two converting steps together to provide a single display showing the traditional distance to fault graph with the distance to fault of the transient event superimposed.

* * * * *